US008070300B2

(12) United States Patent
Yoshii

(10) Patent No.: US 8,070,300 B2
(45) Date of Patent: Dec. 6, 2011

(54) PROJECTION DISPLAY WITH A DETACHABLE LAMP

(75) Inventor: Shouichi Yoshii, Habikino (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 114 days.

(21) Appl. No.: 11/873,122

(22) Filed: Oct. 16, 2007

(65) Prior Publication Data

US 2008/0088806 A1    Apr. 17, 2008

(30) Foreign Application Priority Data

Oct. 16, 2006    (JP) ................. 2006-281214

(51) Int. Cl.
*G03B 21/14*    (2006.01)
*G03B 21/20*    (2006.01)
*G03B 21/22*    (2006.01)

(52) U.S. Cl. .............. 353/87; 353/85; 353/119
(58) Field of Classification Search ........... 353/22, 353/52, 56, 85–87, 98–99, 119, 122; 362/362, 362/368, 370, 374–375, 640, 647, 649, 657, 362/296.01, 341, 389, 378, 282; 348/789
See application file for complete search history.

(56) References Cited

U.S. PATENT DOCUMENTS

| 1,341,471 | A | * | 5/1920 | Knoblock ................ 362/188 |
| 4,384,319 | A | * | 5/1983 | Blaisdell et al. ....... 362/296.03 |
| 4,985,815 | A | * | 1/1991 | Endo ..................... 362/294 |
| 6,227,686 | B1 | * | 5/2001 | Takahashi et al. ........ 362/345 |
| 6,461,025 | B1 | * | 10/2002 | Payne ..................... 362/374 |
| 6,575,606 | B2 | * | 6/2003 | Shaw ..................... 362/433 |
| 6,710,526 | B1 | * | 3/2004 | Helbig ................... 362/640 |
| 7,097,343 | B2 | * | 8/2006 | Tiesler-Wittig et al. ... 362/651 |
| 7,261,459 | B2 | * | 8/2007 | Saegusa ................. 362/652 |
| 7,275,855 | B2 | * | 10/2007 | Protsch et al. ........... 362/652 |
| 7,331,699 | B2 | * | 2/2008 | Gawalkiewicz et al. ... 362/648 |
| 7,517,112 | B2 | * | 4/2009 | Miletich et al. ......... 362/269 |
| 2001/0030865 | A1 | * | 10/2001 | Glowach et al. ......... 362/294 |
| 2003/0151920 | A1 | * | 8/2003 | Shin ..................... 362/282 |
| 2005/0041420 | A1 | * | 2/2005 | Tiesler-Wittig et al. ... 362/226 |

(Continued)

FOREIGN PATENT DOCUMENTS

CN    1401067 A    3/2003

(Continued)

OTHER PUBLICATIONS

Chinese Office Action issued May 8, 2009 in corresponding Chinese Application No. 200710162673.

(Continued)

*Primary Examiner* — Tony Ko
*Assistant Examiner* — Jori S Reilly-Diakun
(74) *Attorney, Agent, or Firm* — Westerman, Hattori, Daniels & Adrian, LLP

(57) ABSTRACT

A projection enabling replacement of its lamp with minimum components. The light source lamp section includes a high-pressure discharge lamp and a metal reflector to which the high-pressure discharge lamp is attached. A plurality of engaging portions are provided on an opening rim of the metal reflector, while engaged portions are provided in a lamp housing section of the body of the projection display. The engaged portions are engaged with the engaging portions. By engaging the plurality of engaging portions of the opening rim with the engaged portions of the lamp housing section, the light source lamp section is secured to the lamp housing section of the body.

6 Claims, 9 Drawing Sheets

U.S. PATENT DOCUMENTS

| | | | |
|---|---|---|---|
| 2005/0146688 A1* | 7/2005 | Takemi | 353/87 |
| 2005/0243287 A1* | 11/2005 | Pate et al. | 353/87 |
| 2008/0007703 A1* | 1/2008 | Menard | 353/119 |

FOREIGN PATENT DOCUMENTS

| | | | |
|---|---|---|---|
| CN | 1612992 A | 5/2005 | |
| JP | 2003-280096 A | 10/2003 | |
| JP | 2005-019039 A | 1/2005 | |
| JP | 2006-244932 A | 9/2006 | |
| WO | 02/48609 A1 | 6/2002 | |
| WO | 03/056237 A1 | 7/2003 | |

OTHER PUBLICATIONS

Japanese Office Action dated May 11, 2010, issued in corresponding Japanese Patent Application No. 2006-281214.

* cited by examiner

PROJECTION DISPLAY WITH A DETACHABLE LAMP

The priority application Number JP2006-281214 upon which this Patent application is based is hereby incorporated by reference.

BACKGROUND OF THE INVENTION

1. Field of the Invention

This invention relates to a projection display, more particularly to a light-source lamp unit used in a projector.

2. Description of the Related Art

Projection displays, such as liquid crystal projectors, are a well-known technique to project enlarged images of letters, figures and so on. Such a projection display uses a lamp unit that is a box case including a high-intensity lamp with a reflecting mirror (reflector) because the lamp in the projection display is required to produce a predetermined light output. A brief description will be made about the structure of a conventional lamp unit and a projector where the lamp unit is set.

FIGS. 14 and 15 illustrate the conventional projector: FIG. 14 is a perspective view of a lamp unit in schematic form; and FIG. 15 is a partially cut-out perspective view of a projector in which the lamp unit is attached.

As shown in FIG. 14, a lamp unit 1100 having a box case 1102 includes a high-intensity lamp 1104 with a reflecting mirror (reflector) 1103 is detachable from a projector body 1110. Such a detachable lamp unit is realized with a pin 1105 provided on the lamp unit 1100 and the corresponding plug 1116 provided in the body. There is no problem to put the pin 1105 in the body 1110 and the plug 1116 on the lamp unit 1100.

Attaching the lamp unit 1100 to the body 1110 couples the pin 1105 and the plug 1116. The plug 1 116 is electrically connected to a lighting circuit (not shown) provided in the body 1110. The lighting circuit starts/lights the lamp 1104 of the lamp unit 1100. There are a cooling fan 1117 and a cover 1111 behind and above the lamp unit 1100 attached in the body 1110, respectively.

In the body 1110, an optical system having the lamp as a light source and an image modulating means, which is used for controlling the optical system to display images and includes a liquid crystal panel and other components, are provided. Light emitted from the lamp 1104 passes through the optical system and projection lens 1114 and is projected onto a screen as an image.

By the way, many of the above-mentioned reflecting mirrors (reflector) 1103 are generally made of glass. The lamp, as discussed above, is attached to the body 1110 as a part of the lamp unit 1100. Because of this, replacement of the lamp involves replacement of the whole lamp unit 1100. An image display device in which an entire lamp unit is attached to the device body is disclosed in Japanese unexamined patent publication No. 2003-280096, for example.

SUMMARY OF THE INVENTION

Should the necessity to replace the high-pressure discharge lamp (burner) of the conventional display devices arise due to breakage or the like, the entire lamp unit has to be replaced. Even though the other components of the lamp unit except for the lamp, for example, the box case, have no damage, they are replaced and discarded together with the lamp. This wastes the components as well as increases the cost. Discarding the serviceable components results in waste of resources.

The present invention has an object to provide a projection display with a replaceable lamp involving the replacement of a minimum number of components.

In a projection display according to the present invention, a light modulating device modulates light from a light source according to an image signal and a projection lens enlarges and projects the light as an image. The projection display comprises a light source lamp section and a body. The light source lamp section includes a high-pressure discharge lamp, a metal reflector to which the high-pressure discharge lamp is attached and a plurality of engaging portions provided on a rim at an opening of the reflector. The body includes a lamp housing section having a hole and a plurality of engaged portions provided with the hole and for engaging with the engaging portions. The plurality of engaging portions on the rim of the reflector are engaged with the engaged portions of the lamp housing section to secure the light source lamp section to the body of the projection display.

According to the projection display, the light source lamp section having the reflector can be directly secured to the body, thereby reducing the number of components and resulting in cost reduction.

The engaging portions can be flanges formed on the outer region of the rim of the opening so as to project outwardly.

The engaging portions can be slots and slits adjoining the slots, both formed on the rim of the opening.

In addition, the reflector may include an explosion-proof glass secured at the front opening of the reflector by a screw. The high-pressure discharge lamp may be secured to the reflector by a screw.

In addition, the lamp housing section of the body may be provided with an explosion-proof glass.

Furthermore, the reflector may have cooling fins on the outer region in proximity of the focal point.

DETAILED DESCRIPTION OF THE PREFERRED EMBODIMENTS

Figure 1:
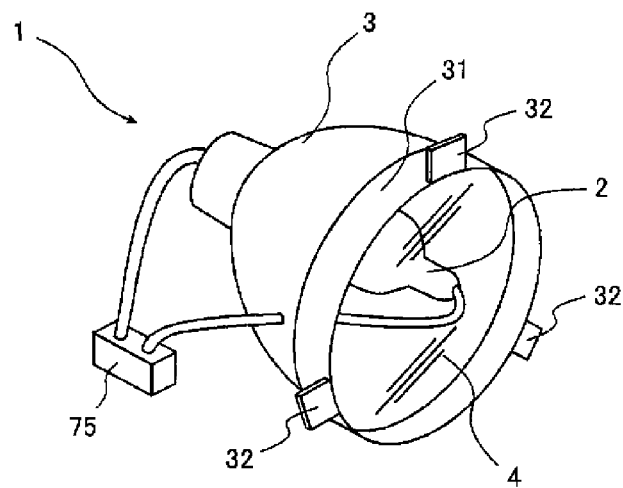
FIG. 1 is a perspective view of a light source lamp section of a projection display according to the first embodiment of the present invention.

Referring to the drawings, embodiments of the present invention will be now described in detail. Through the drawings, the same or equivalent components are denoted by the same numerals and will not be further explained to avoid repetition.

Figure 2:
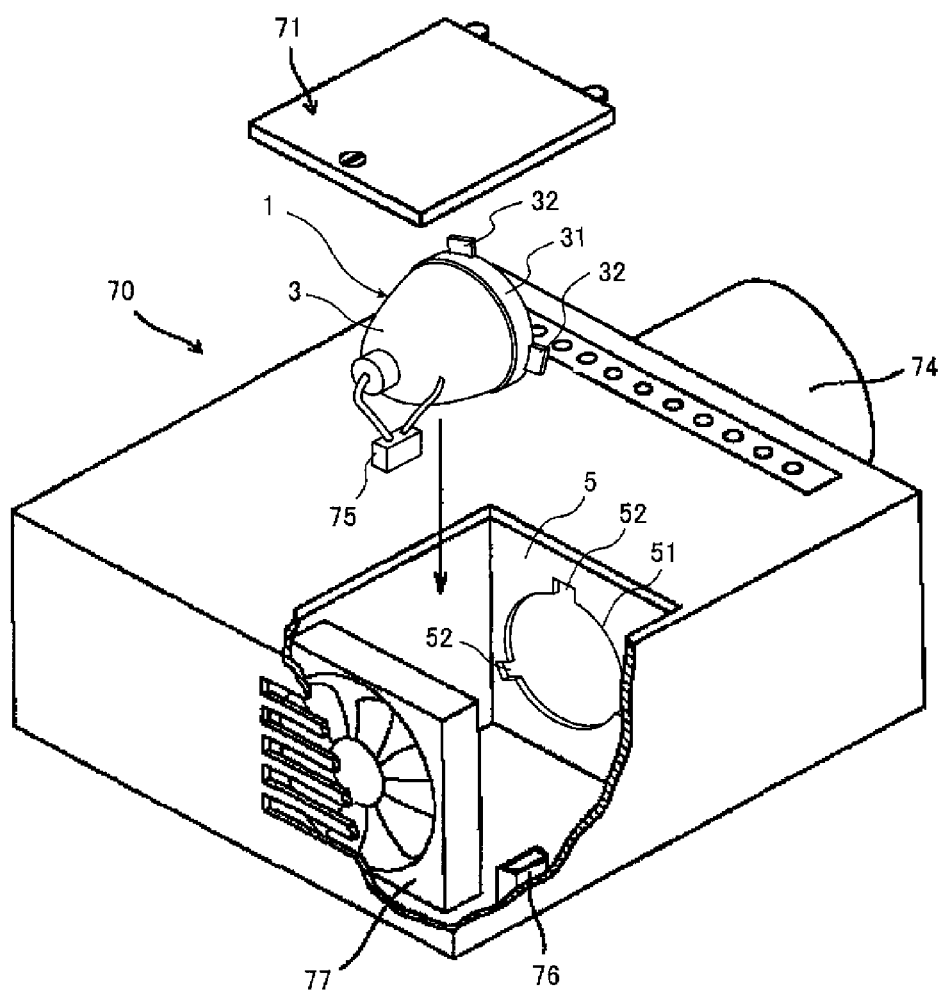
FIG. 2 is a partially cut-out perspective view of a projection display body, in schematic form, to which the light source lamp section is attached, according to the first embodiment of the present invention.
Figure 3:
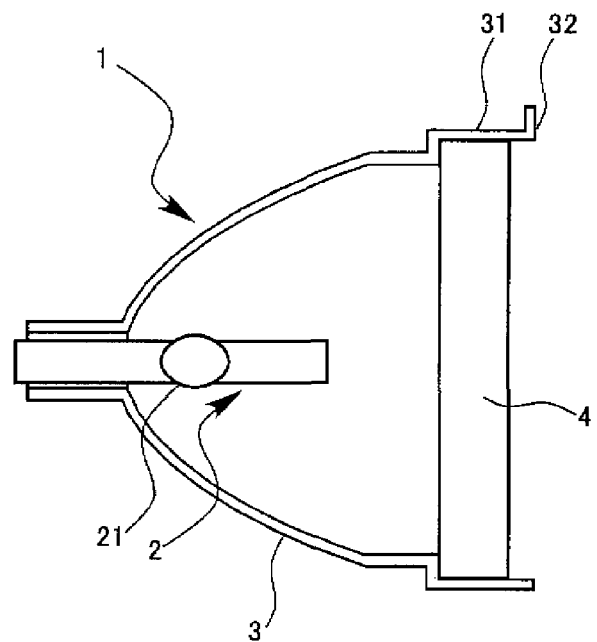
FIG. 3 is a schematic diagram of the light source lamp section of the projection display according to the first embodiment of the present invention.
Figure 4:
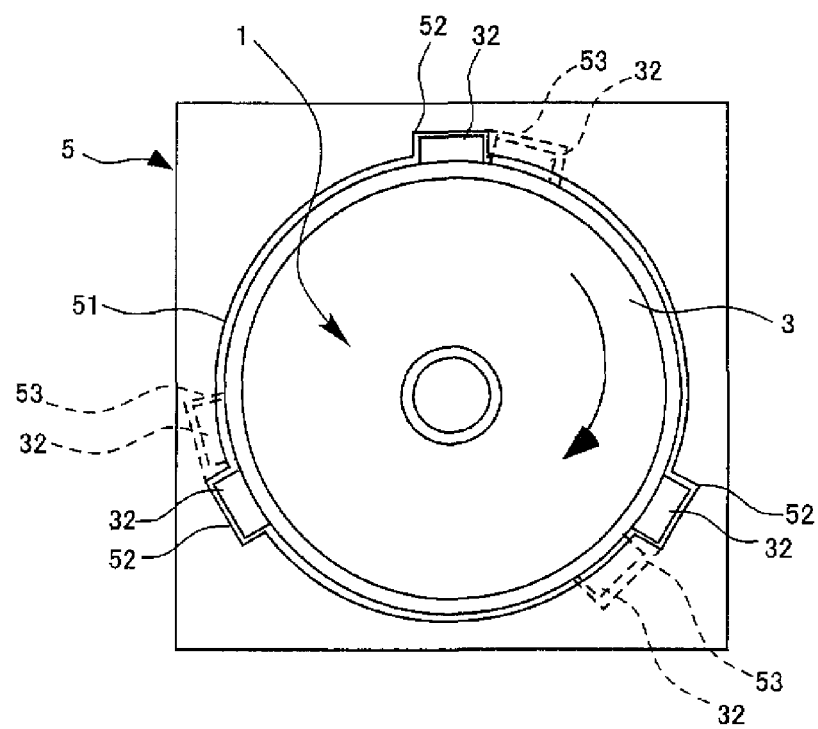
FIG. 4 is a schematic diagram of the light source lamp section of the projection display, viewed from the rear, according to the first embodiment of the present invention.

FIG. 1 is a perspective view of a light source lamp section of a projection display according to the first embodiment of the present invention. FIG. 2 is a partially cut-out perspective view of the projection display body, in schematic form, to which a lamp unit is attached. FIG. 3 is a schematic diagram of the light source lamp section of the projection display according to the first embodiment of the present invention. FIG. 4 is a schematic diagram of the light source lamp section of the projection display, viewed from the rear, according to the first embodiment of the present invention.

As shown in FIG. 3, the light source lamp section 1 of the projection display according to the embodiment includes a high-pressure discharge lamp 2, a metal reflector 3 to which this high-pressure discharge lamp 2 is secured and an explosion-proof front glass 4 for blocking the front opening of the metal reflector 3.

The high-pressure discharge lamp 2 is, for example, a high pressure mercury lamp and has a light emitting portion 21 with a light emitting material filled therein. The metal reflector 3 has a concave reflecting surface in the shape of an ellipsoid, hemisphere or parabola. At the center of an optical axis of the concave reflecting surface, the high-pressure discharge lamp 2 is secured. In FIG. 3, lead wires and so on are omitted.

The light source lamp section 1 is detachable from the body 70 of the projection display as shown in FIG. 2. Such a detachable light source lamp section 1 is realized by placing a plug 76, which corresponds to a pin 75 provided on the light source lamp section 1, in the body 70. There is no problem to place the pin 75 in the body 70 and the plug 76 on the light source lamp section 1.

When the light source lamp section 1 is attached into the body 70, the pin 75 is coupled with the plug 76. The plug 76 is electrically connected with a lighting circuit (not shown) in the body 70. The lighting circuit starts/lights the high-pressure discharge lamp 2 of the light source lamp section 1. A cooling fan 77 is mounted behind the light source lamp section 1 set in the body 70 and a cover 71 is attached above the light source lamp section 1.

Inside the body 70, there are an optical system having a lamp as a light source and an image modulating means that is used to control the optical system to display images and includes a liquid crystal panel and so on. Light emitted from the high-pressure discharge lamp 2 passes the optical system and a projection lens 74 and is projected on a screen as an image.

Figure 5:
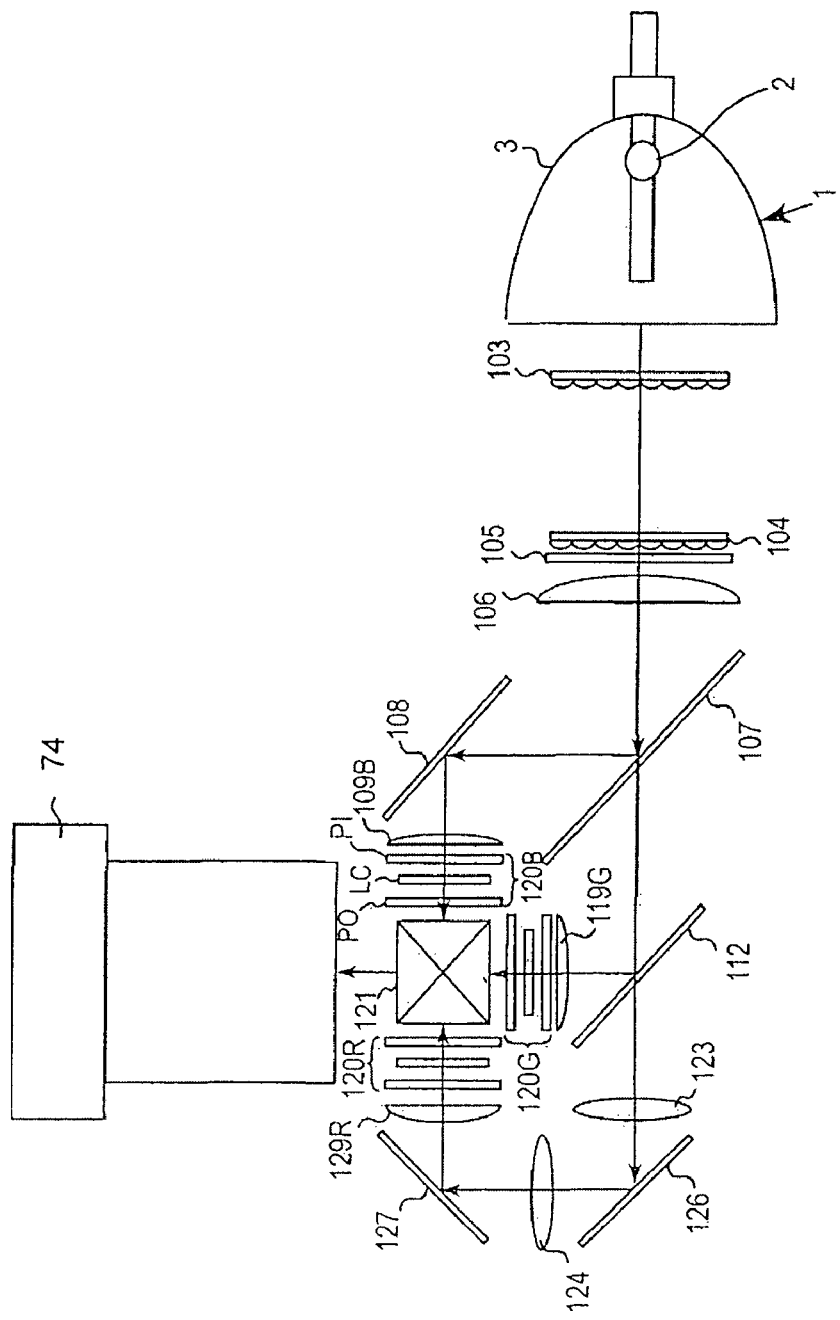
FIG. 5 is a schematic diagram of a three-liquid-crystal-panel (3LCD) projection display employing a dichroic prism system.

Some of projection displays capable of producing images in color employ three primary colors, red (R), green (G), blue (B). FIG. 5 is a schematic diagram of a three-liquid-crystal-panel (3LCD) projection display using a dichroic prism system as a projection display.

The 3LCD projection display with the dichroic prism system will be now described by referring to FIG. 5. The light source lamp section 1 of the 3LCD projection display 100 includes a high-pressure discharge lamp 2 and a parabolic reflector 3 that converts white light emitted from the high-pressure discharge lamp 2 into an approximately collimated light beam. Then, the light emitted from the light source lamp section 1 passes a UVIR filter (not shown) to remove its UVIR components for the purpose of reducing heat load on the following optical members.

The collimated light emitted from the parabolic reflector 3 is split into light beams by a fly-eye integrator consisting of first and second fly-eye lenses 103, 104 both including a group of convex lenses. Each light beam is converged and incident to a polarizing converter 105 that aligns the polarizing directions of the light beams and emits them. After the light beams having a single polarization pass a condenser lens 106, light in the red to green wavelength passes a dichroic mirror 107, while light in the blue wavelength is reflected off the dichroic mirror 107.

The light in the blue wavelength, which is reflected by the dichroic mirror 107 and changes its optical path at 90 degrees, is further reflected off a total reflection mirror 108 and changes its optical path at 90 degrees. Then, the light enters through a field lens 109B to a blue liquid-crystal display element 120B for displaying images having light components in the blue wavelength, in which the light is modulated according to input signals. The modulated light enters a dichroic prism 121 that bends the optical path of the light at 90 degrees and then enters a projection lens 74 that projects the light as an enlarged image on a screen (not shown).

On the other hand, the light in the red to green wavelength, which passed the dichroic mirror 107, enters a dichroic mirror 112. Since the dichroic mirror 112 has a property of reflecting light in the green wavelength, light in the green wavelength is reflected by the dichroic mirror 112 and changes its optical path at 90 degrees. Then the light enters through a field lens 119G to a green liquid-crystal display element 120G for displaying images having light components in the green wavelength, in which the light is modulated according to input signals. The modulated light in the green wavelength enters a dichroic prism 121 and projection lens 74 in sequence and is projected as an enlarged image on the screen.

The light in the red wavelength, which passed the dichroic mirror 112, passes lenses 123, 124, total reflection mirrors 126, 127 and a field lens 129R and enters a red liquid-crystal display element 120R for displaying images having light components in the red wavelength, in which the light is modulated according to input signals. The modulated light in the red wavelength enters a dichroic prism 121 that bends its optical path at 90 degrees and enters the projection lens 74 that projects the light as an enlarged image on the screen. Each of the liquid-crystal display elements 120B, 120G, 120R includes a polarizer for input PI, a liquid crystal LC and a polarizer for output PO.

The reflector 3 of the light source lamp section 1 according to the embodiment is made of metal and has a plurality of flanges 32, which are engaging portions, provided on a rim 31 at an opening of the reflector 3 so as to project outwardly. In this embodiment, three flanges 32 are arranged at intervals of 120 degrees. Since the reflector 3 is made of metal, the flange 32 can be added easily by bending work and so on.

As shown in FIG. 2, in this embodiment, an attachment section 5, which is positioned where the light source lamp section 1 is attached and housed (lamp housing section), of the body 70 has a hole 51 to which the outer region of the rim 31 of the reflector 3 is inserted. This hole 51 is provided with slots 52 to which the flanges 32 are inserted and claws 53 adjoining the slots 52 at intervals of 120 degrees.

As shown in FIGS. 2 and 4, the flanges 32 of the reflector 3 are aligned with the hole 51 of the attachment section 5 in the body 70, and then the reflector 3 is turned in the direction of the arrow to engage the flanges 32 with the claws 53. The engagement of the flanges 32 and claws 53 secures the light source lamp section 1 at a predetermined position of the hole 51 of the attachment section 5 in the body 70.

This engagement of the slots 52 and claws 53 of the attachment section 5 in the body 70 and the flanges 32 formed on the rim 31 of the reflector 3 can be made in the same method of aligning and turning claws and slots often used to secure a ceiling light, for example.

According to the embodiment, the light source lamp section 1 having the reflector can be secured directly to the body of the projection display, thereby reducing the number of components and resulting in cost reduction.

Figure 6:
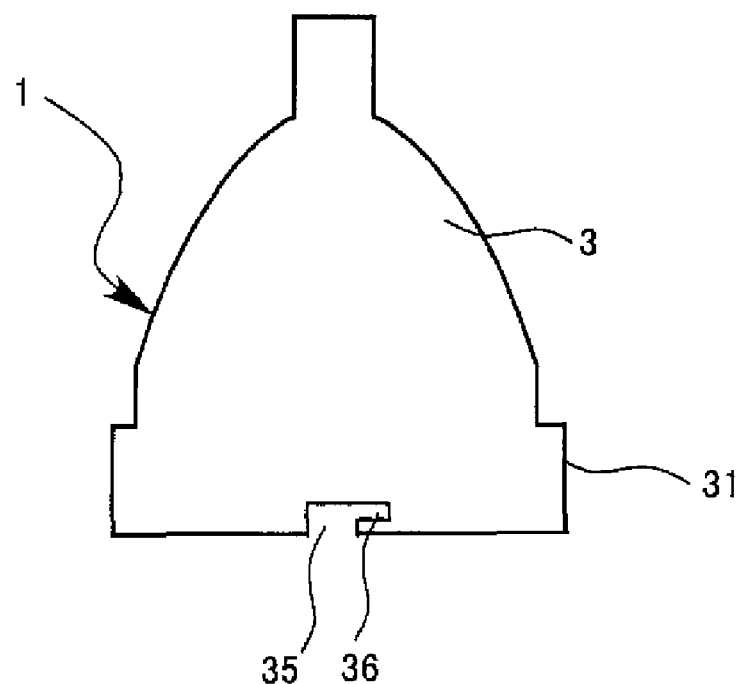
FIG. 6 is a schematic diagram of a light source lamp section of a projection display according to the second embodiment of the present invention.
Figure 7:
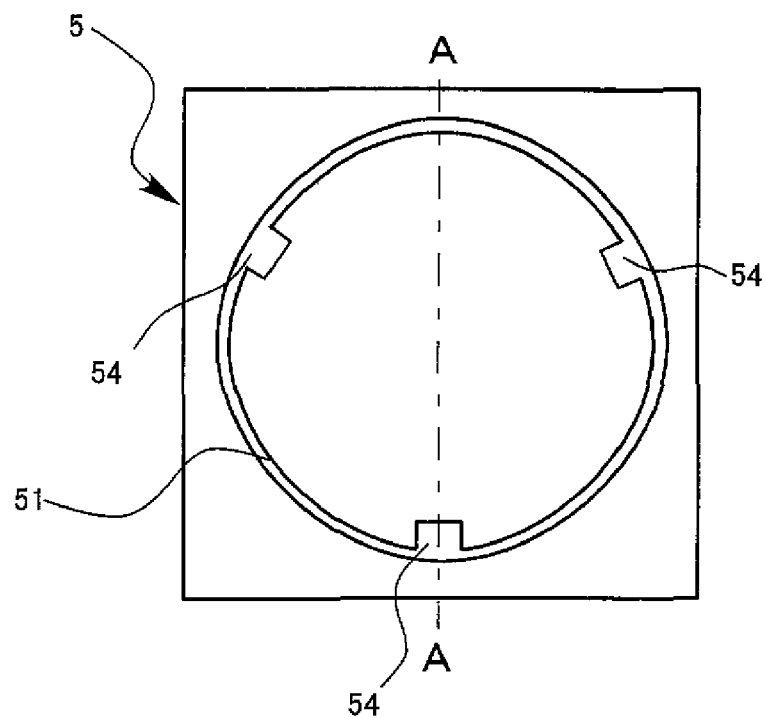
FIG. 7 is a front view illustrating the part, to which the lamp is inserted, of the body of the projection display according to the second embodiment of the invention.
Figure 8:
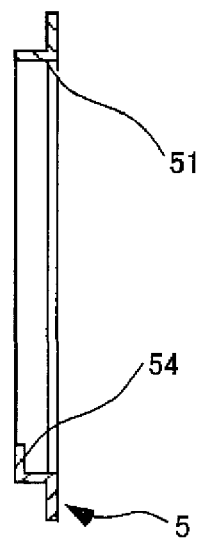
FIG. 8 is a cross-sectional view taken along the line A-A in FIG. 7.

Referring to FIGS. 6 to 11, a description will be made about the second embodiment of the present invention. FIG. 6 is a schematic diagram of a light source lamp section of the projection display according to the second embodiment of the invention. FIGS. 7 and 8 illustrate the part, to which the lamp is inserted, of the body of the projection display according to the second embodiment of the invention: FIG. 7 is a front view; and FIG. 8 is a cross-sectional view taken along the line A-A in FIG. 7.

As shown in FIG. 6, the reflector 3 of the second embodiment is provided with three slots 35 and three slits 36 adjoining the slots 35, both constitute engaging portions, on a rim 31 of the reflector 3 along its circumference at intervals of 120 degrees. While the flanges 32 function as engaging portions in the first embodiment, the slots 35 and slits 36 function as the engaging portions in the second embodiment.

An explosion-proof front glass is attached in the inner region of the rim 31, but is not illustrated.

There is a hole 51 at a part (lamp housing section) of the attachment section 5 in the body 70 so that the outer region of the rim 31 of the reflector 3 can be inserted. In order to engage the slots 35 and slits 36 of the reflector 3, protrusions 54 are provided on the hole 51 at intervals of 120 degrees as shown in FIGS. 7 and 8. Each protrusion 54 has a width slightly smaller than the width of the slot 35 and slit 36 of the reflector 3 and a thickness slightly smaller than the depth of the slit 36.

Figure 9:
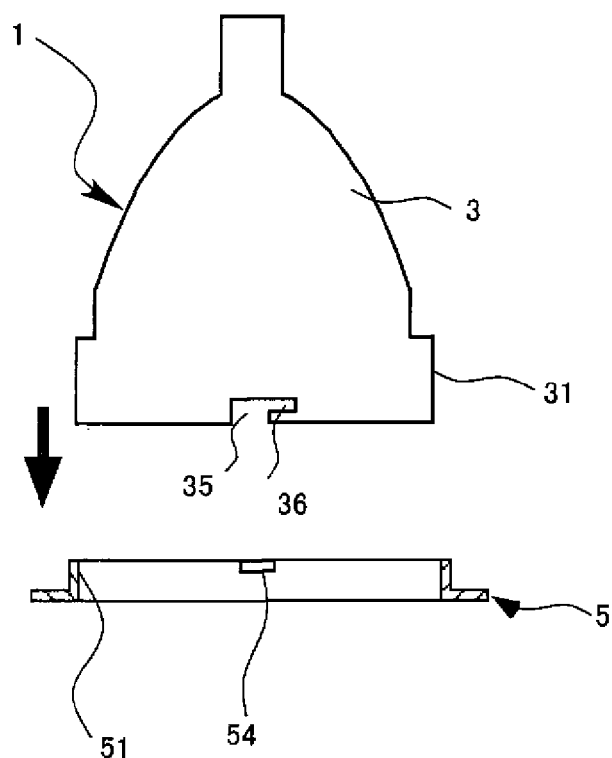
FIG. 9 is a schematic diagram illustrating a process to attach the light source lamp section to the projection display body according to the second embodiment of the present invention.
Figure 10:
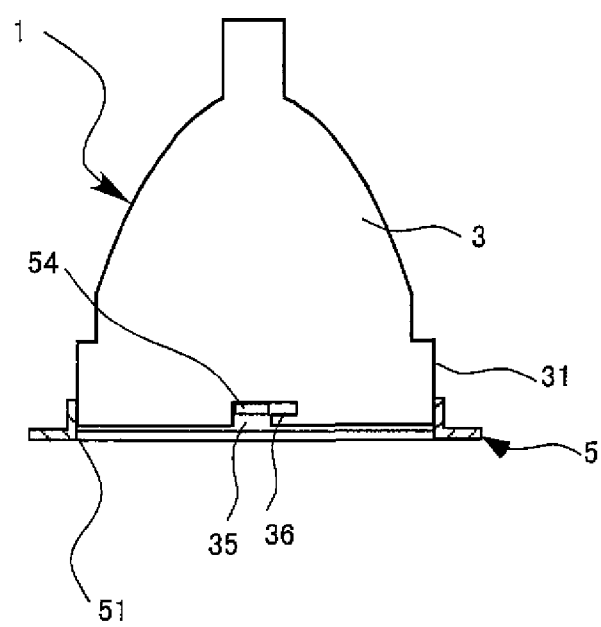
FIG. 10 is a schematic diagram illustrating a process to attach the light source lamp section to the projection display body according to the second embodiment of the present invention.
Figure 11:
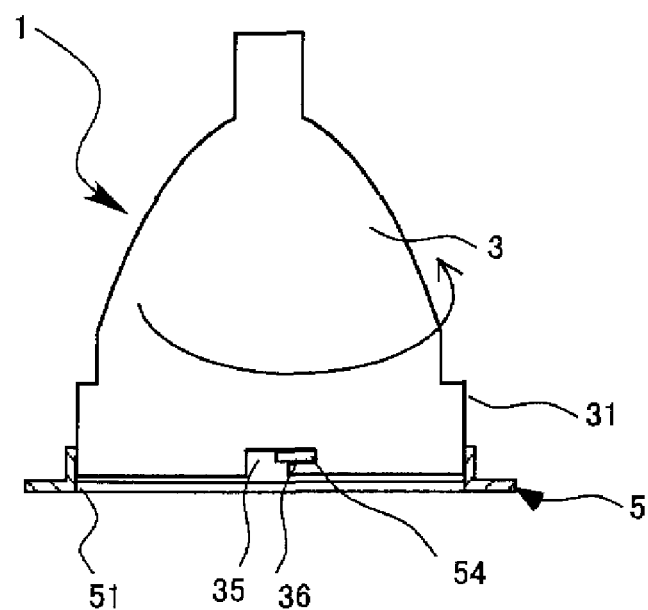
FIG. 11 is a schematic diagram illustrating a process to attach the light source lamp section to the projection display body according to the second embodiment of the present invention.

To insert and secure the light source lamp section 1 to the hole 51 of the attachment section 5 in the body 70, the slots 35 of the lamp section 1 are aligned with the protrusions 54 of the hole 51 of the attachment section 5 as shown in FIG. 9. Then, as shown in FIG. 10, the protrusions 54 are inserted into the slots 35 of the reflector 3. Subsequently, the lamp section 1 is turned in the direction of the arrow with the protrusions 54 abutting the back of the slots 35 until the slits 36 are engaged with the protrusions 54 as shown in FIG. 11. Thus, the light source lamp section 1 is secured at a predetermined position of the hole 51 of the attachment section 5.

According to the second embodiment, the light source lamp section 1 having the reflector 3 can be directly secured to the body 70 of the projection display, thereby reducing the number of components and resulting in cost reduction.

Figure 12:
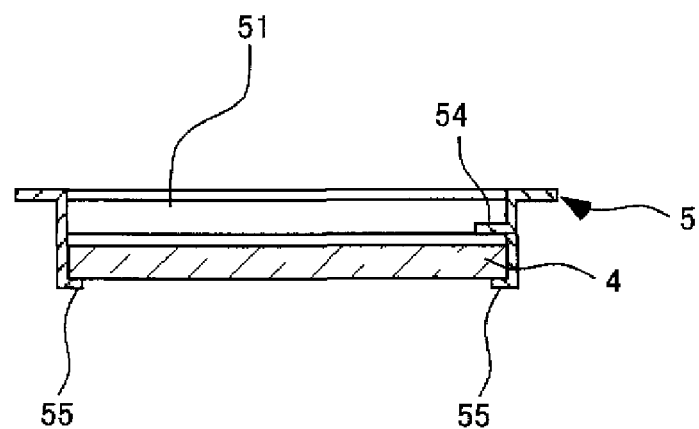
FIG. 12 is a cross-sectional view of the body to which the light source lamp section is attached according to the third embodiment of the present invention.

FIG. 12 is a cross-sectional view showing a part, to which the light source lamp section is attached, of the attachment section 5 in the body 70 according to the third embodiment of the present invention.

While the explosion-proof front glass 4 is attached to the reflector 3 of the lamp section 1 in the second embodiment, in the third embodiment, ribs 55 are provided at the front of the hole 51 of the attachment section 5 in the body 70 in order to hold an explosion-proof glass 4. Since the explosion-proof glass 4 is attached on the body, the lamp section 1 does not need to have the explosion-proof glass. As a result, the unit price of a replacement lamp can be reduced.

Figure 13:
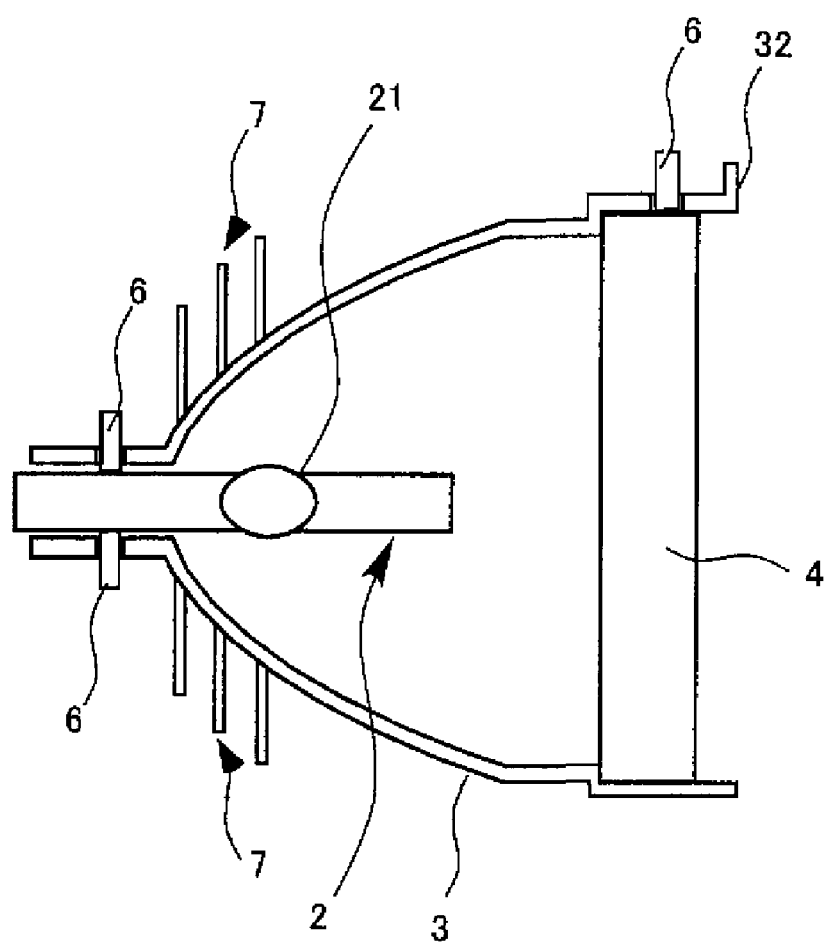
FIG. 13 is a schematic diagram of a light source lamp section according to the fourth embodiment of the present invention.
Figure 14:
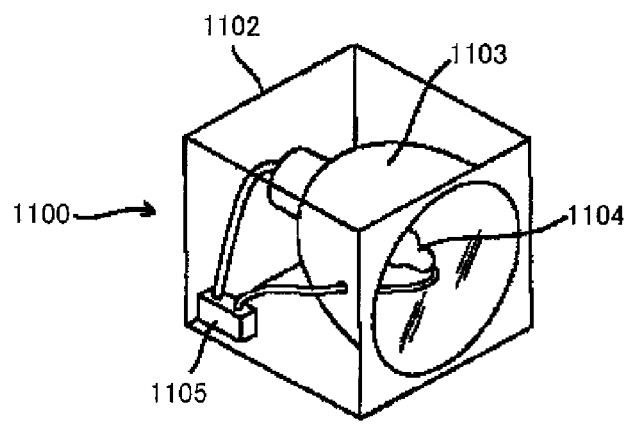
FIG. 14 is a perspective view of a conventional lamp unit in schematic form.
Figure 15:
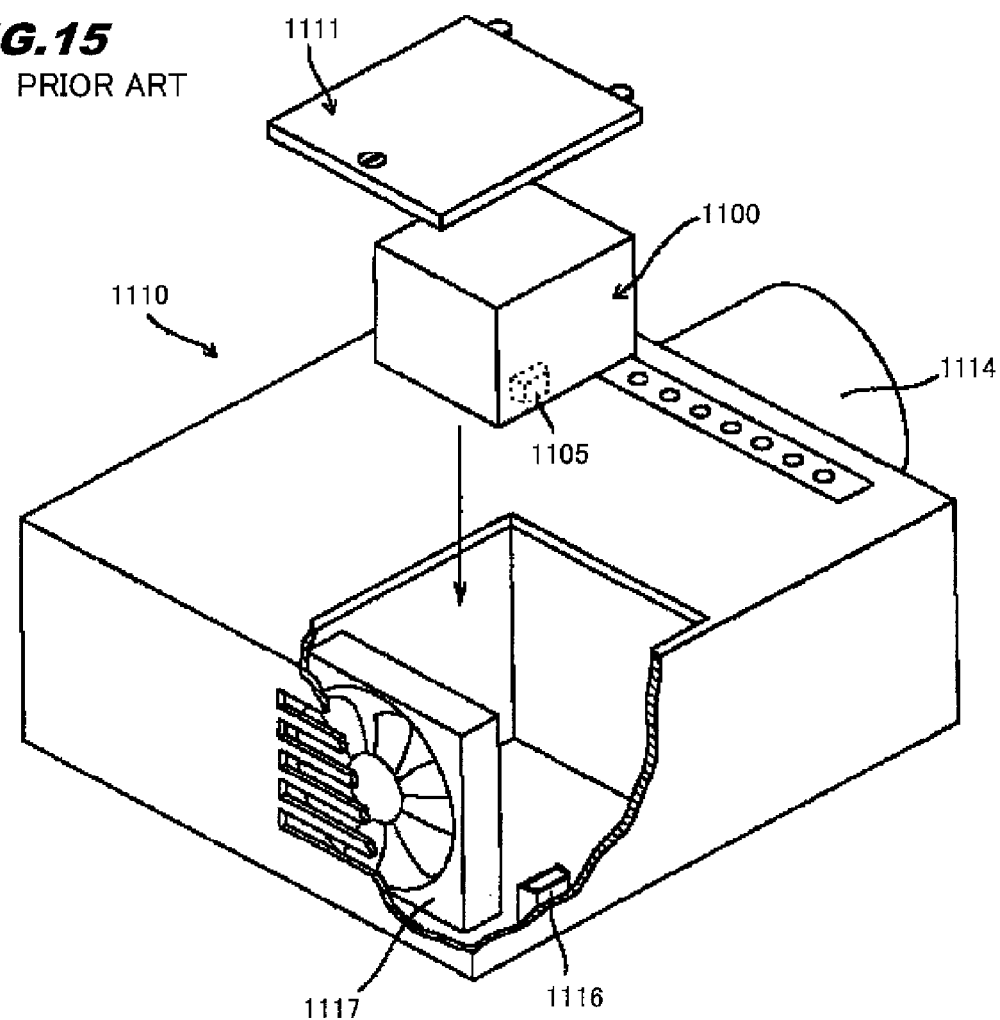
FIG. 15 is a partially cut-out perspective view of a conventional projector in which the lamp unit is attached.

FIG. 13 is a schematic diagram of a light source lamp section of the projection display according to the fourth embodiment of the present invention. In the fourth embodiment, the explosion-proof front glass 4 and high-pressure discharge lamp 2 described in the first and second embodiments are secured to the reflector 3 by securing screws 6. In the first and second embodiments, the explosion-proof front glass 4 and high-pressure discharge lamp 2 are fixed with an adhesive. The use of the screws 6 instead of the adhesive to secure the explosion-proof front glass 4 and high-pressure discharge lamp 2 in the fourth embodiment simplifies the manufacturing process. If the front glass or the high-pressure discharge lamp 2 is damaged, the reflector 3 can be detached by unscrewing the screws 6 and a new explosion-proof front glass or high-pressure discharge lamp 2 can be attached to the reflector 3, thereby realizing reuse of the reflector 3.

It is preferable to use special screws as the screws 6 so that general users cannot take out the screws. That is because the general users may be able to replace the explosion-proof front glass and high-pressure discharge lamp, but may not be able to appropriately set them, and such a risk should be avoided as much as possible.

Furthermore, the reflector 3 in the fourth embodiment has integrally-formed radiating fins 7 on the outer region that is close to the focal point and therefore is raised to the hottest temperature. The provision of the radiating fins 7 on the hottest region of the reflector 3 improves heat dissipation of the lamp section 1, and therefore increases the life of the lamp.

The present invention is used in an optical engine of a projection display such as a projector and a rear projector.

It should be understood that the embodiments disclosed herein are to be taken as examples in every point and are not limited. The scope of the present invention is defined not by the above described embodiments but by the appended claims. All changes that fall within means and bounds of the claims, or equivalence of such means and bounds are intended to be embraced by the claims.

The invention claimed is:

1. A projection display including a light modulating device modulating light from a light source according to an image signal and a projection lens enlarging and projecting the light as an image, comprising:
a light source lamp section including:
a high-pressure discharge lamp;
a metal reflector to which said high-pressure discharge lamp is attached; and a plurality of engaging portions provided on a rim at an opening of said reflector; and
a body including:
a lamp housing section of the body is provided with an attachment section having a hole;
a plurality of engaged portions forming an opening in said attachment section, said opening projecting outwardly from the boundary of said hole,
wherein said hole is provided with claws adjoining said plurality of engaged portions, for engaging with said engaging portions, and
said plurality of engaging portions on the rim of said reflector are engaged with said engaged portions by turning said reflector in a predetermined direction to engage said engaging portions with said claws so that the engagement of the engaging portions and claws secures said light source lamp section at a predetermined position of said hole of the attachment section in said body of the projection display.

2. The projection display according to claim 1, wherein said engaging portions are flanges formed on said rim of said opening so as to project outwardly.

3. The projection display according to claim 1, wherein said engaging portion are slots and slits adjoining said slots, both formed on said rim of said opening.

4. The projection display according to claim 1, wherein said reflector includes an explosion-proof glass secured at the front opening of the reflector by a screw, and
said high-pressure discharge lamp is secured to said reflector by a screw.

5. The projection display according to claim 1, wherein said lamp housing section of the body is provided with an explosion-proof glass.

6. The projection display according to claim 1, wherein said reflector has cooling fins on the outer region in proximity of the focal point.

* * * * *